15600881A

United States Patent [19]
Wanha

[11] Patent Number: 5,600,881
[45] Date of Patent: Feb. 11, 1997

[54] CONNECTOR SEATING PRESS

[75] Inventor: Christopher D. Wanha, Costa Mesa, Calif.

[73] Assignee: ITT Corporation, New York, N.Y.

[21] Appl. No.: 340,786

[22] Filed: Nov. 17, 1994

Related U.S. Application Data

[63] Continuation-in-part of Ser. No. 60,665, May 13, 1993, Pat. No. 5,368,802.

[51] Int. Cl.⁶ .............................. B23P 19/02; H01R 43/00; H05K 3/32
[52] U.S. Cl. ................................ 29/741; 29/747; 29/760; 269/903
[58] Field of Search .............................. 29/739, 740, 741, 29/747, 753, 760, 761, 845, 33 M, 243.5, 509; 100/231; 264/249; 269/50, 51, 903

[56] References Cited

U.S. PATENT DOCUMENTS

| | | | |
|---|---|---|---|
| 3,419,297 | 12/1968 | Diepenhorst et al. | 264/249 X |
| 3,791,018 | 2/1974 | Johnston et al. | 228/180.1 |
| 3,832,432 | 8/1974 | Perry | 264/249 |
| 4,195,219 | 3/1980 | Friese | 264/249 X |
| 4,503,610 | 3/1985 | Resch | 29/845 |
| 4,573,262 | 3/1986 | Dornes et al. | 29/739 |
| 4,590,673 | 5/1986 | Dornes et al. | 29/845 |
| 4,633,559 | 1/1987 | Loren | 29/243.5 |
| 4,649,633 | 3/1987 | Bocchicchio et al. | 29/739 |
| 4,670,978 | 6/1987 | Fickes et al. | 29/739 X |
| 4,700,488 | 10/1987 | Curti | 269/903 X |
| 4,767,298 | 8/1988 | Bocchicchio et al. | 29/243.5 X |
| 5,018,957 | 5/1991 | Assink et al. | 264/249 X |
| 5,046,953 | 9/1991 | Shreeve et al. | 29/840 X |
| 5,208,975 | 5/1993 | Hidese | 29/740 X |
| 5,227,173 | 7/1993 | Sherwood | 264/249 X |
| 5,235,740 | 8/1993 | Kroeker et al. | 29/741 |
| 5,249,343 | 10/1993 | Grosso et al. | 269/51 X |

FOREIGN PATENT DOCUMENTS

| 48238 | 3/1985 | Japan | 269/903 |
| 105429 | 5/1987 | Japan | 269/903 |

*Primary Examiner*—Peter Vo
*Attorney, Agent, or Firm*—Thomas L. Peterson

[57] ABSTRACT

A press apparatus is described for forcefully pressing a connector (14, FIG. 1) against a circuit board (12) to press projections (34) of the connector into circuit board holes (22), which minimizes set up time. The press includes a pair of platforms (60, 62, FIG. 2) on which a circuit board with a connector thereon is laid, an upper tooling arrangement (102) mounted on a ram, and a lower tooling arrangement (100) mounted on a stationary base (78). When the ram is lowered, it causes the circuit board and the connector thereon to move down against the lower tooling arrangement, and then seat the connector. The force of the ram is transmitted through the connector and circuit board to the lower tooling arrangement, so in many cases the stroke of the ram does not have to be adjusted for the thickness of the particular circuit board or connector. The two platforms have adjustable edge guides (66, 68) that abut opposite side edges of the circuit board, the platforms being movable together and apart to accommodate different circuit board widths, and each platform being downwardly movable against the force of a spring (74). A pair of retainers (132, 134) mounted on the ram, first engage opposite edge portions of the circuit board and move down the platforms, before the ram engages and pushes down the connector.

7 Claims, 5 Drawing Sheets

CONNECTOR SEATING PRESS

CROSS-REFERENCE

This is a continuation-in-part of U.S. Ser. No. 08/060,665 filed May 13, 1993, now U.S. Pat. No. 5,368,802.

BACKGROUND OF THE INVENTION

A common technique for mounting a connector on a circuit board, is to place the connector over the circuit board with connector projections aligned with circuit board holes. A lower tooling arrangement supports the bottom of the circuit board while an upper tooling arrangement on a ram moves down to press down the connector and thereby force the connector projections into the circuit board holes. The most common press arrangement includes a fixed platform on which the circuit board is placed, a lower tooling arrangement lying against the bottom of the circuit board or movable up against the bottom of the circuit board, and a ram whose downward stroke is closely controlled to move just far enough to seat the connector on the circuit board. The ram stroke can be manually adjusted or can be automatically adjusted by a closed loop electronic control, for variations in thickness of the circuit board and connector.

Processes that require the lower tooling arrangement to travel upward, increase the complexity and cost of the press, especially when high forces are encountered. On the other hand, requiring an operator to manually place a circuit board directly against a stationary lower tooling arrangement increases the cycle time and increases the possibility of damage to components on the lower side of the circuit board. Closed loop electronic controls to stop and retract the ram are of increased complexity and cost, while the manual adjustment of ram stroke adds to the set-up time.

It is common for a press for a particular set up, to "run" on the order of 100 circuit boards, wherein each circuit board is placed in the press with a set of connectors thereon that are to be seated on the board. The thickness of circuit boards commonly ranges between one-eighth and one-sixteenth inch, while the thickness of connectors commonly ranges between about one-fourth and one-half inch. A press of minimum complexity which could seat connectors on circuit boards with minimal adjustment of the press for variations in circuit board and connector thickness, and with fast setup and cycle times, would be of value.

SUMMARY OF THE INVENTION

In accordance with one embodiment of the present invention, a press apparatus is described, which is of only moderate complexity and which facilitates press set up to seat connectors on circuit boards, where the width and thickness of the boards and the thickness, width, and location of the connectors vary. The press apparatus includes a platform device positioned to support a circuit board with a connector thereon, with the platform device being vertically movable but biased upwardly. A lower tooling arrangement is mounted at a stationary position, while an upper tooling arrangement is mounted on a ram. As the ram moves down, it causes the platform device and the circuit board thereon to move down, until the circuit board is supported by the lower tooling arrangement. Further downward movement of the ram causes the upper tooling arrangement thereon to press down the connector and seat it on the circuit board. The entire downward force applied by the ram is transferred through the connector and circuit board to the lower tooling arrangement.

The platform device can include first and second platforms that are each positioned to support a side edge portion of a circuit board, with each platform being vertically movable and upwardly biased, and with at least one platform being movable towards and away from the other to adjust for circuit board width. A pair of retainers can be mounted on the ram, with each retainer having a spring biased foot positioned to engage a side portion of a circuit board and to move it and a corresponding platform down to the lowermost position, before the upper tooling arrangement on the ram engages and presses down the connector.

The novel features of the invention are set forth with particularity in the appended claims. The invention will be best understood from the following description when read in conjunction with the accompanying drawings.

DESCRIPTION OF THE PREFERRED EMBODIMENT

Figure 1:
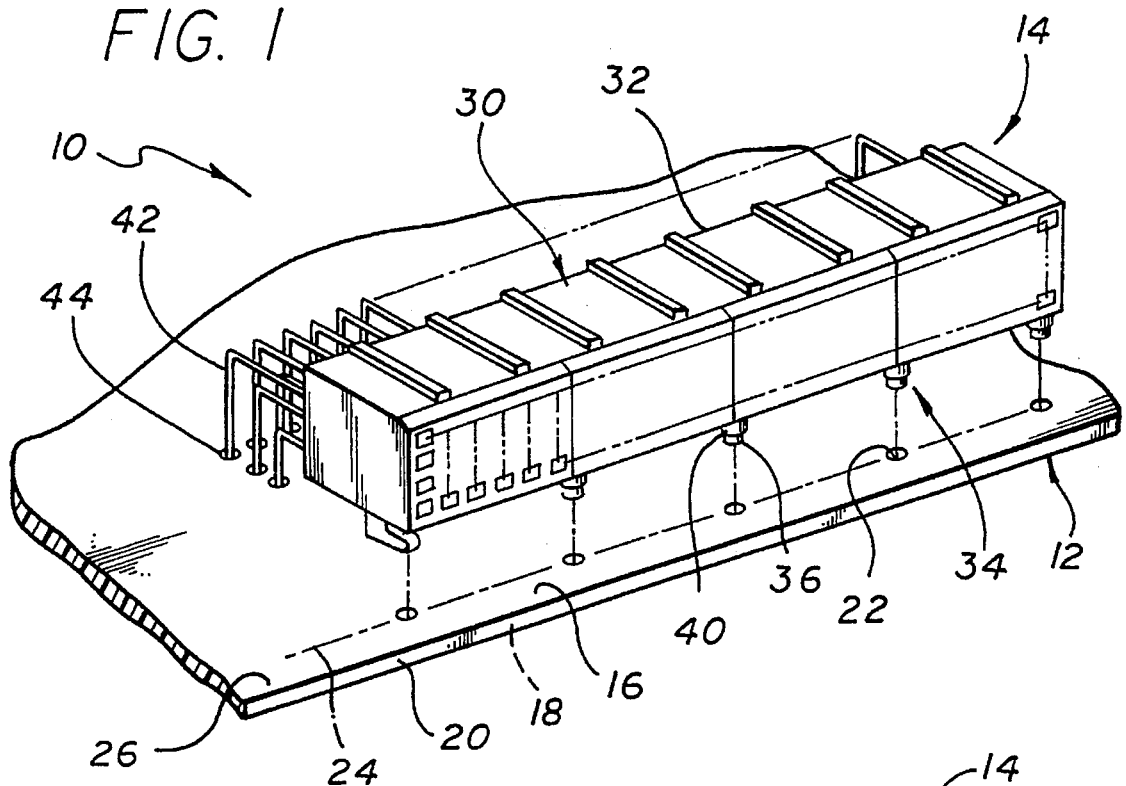
FIG. 1 is an exploded isometric view of a portion of a circuit board and of a connector which can be seated thereon.

FIG. 1 illustrates a connector and circuit board combination 10 which includes a circuit board 12 and a connector 14 to be seated thereon. The circuit board has upper and lower faces 16, 18, a forward edge 20, and a row of board holes 22 extending along a row line 24 at a forward edge portion 26 of the board. The connector includes a housing 30 with a main housing portion 32 and with projections 34 extending downwardly from the main housing portion. The projections 34 may be integrally molded with the main housing portion, or may include separate parts that are mounted on the main housing portion or on pegs that project from the main housing portion. The connector is mounted on the board by aligning the projections 34 with the board holes, as by inserting alignment parts 36 of the projections into the board holes. Then the connector is forcefully pushed down to seat the interfering parts 40 in interference fit with the board holes. It is noted that a particular connector has contacts 42 that are received in plated-through holes 44 in the board to connect to traces on the board. The connector is of a type which includes a plurality of modules, with the connector of FIG. 1 having four modules.

Figure 4:
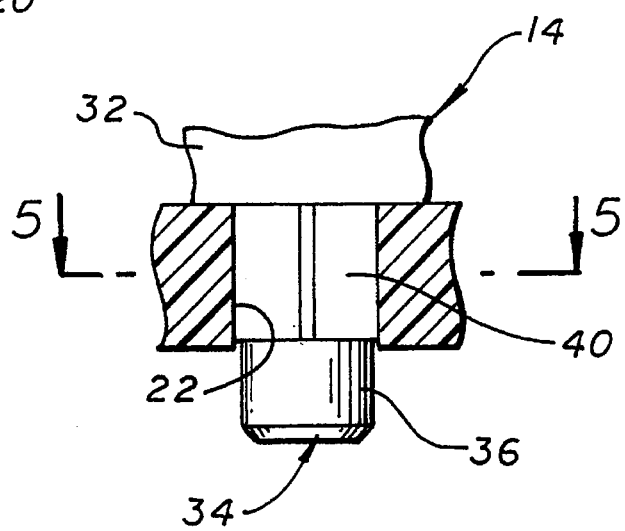
FIG. 4 is a sectional view showing a connector projection fully seated in a circuit board.
Figure 5:
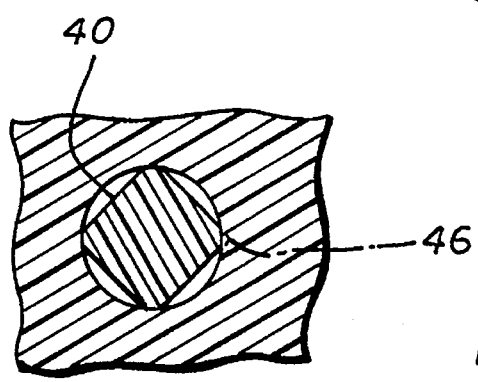
FIG. 5 is a view taken on line 5—5 of FIG. 4.

FIG. 4 shows the connector 14 fully seated on the circuit board 12, with parts 40 lying in interference with the board holes 22. As indicated in FIG. 5, the particular projections are constructed so each interfering part 40 is of square cross section, with corner regions 46 that are sheared off by the walls of the board hole. A common type of projection of the type shown at 34 requires a downward force of about 25 pounds for each projection, so that it requires a downward force of about 125 pounds to seat a connector having five of such projections as shown in FIG. 1. A wide board may hold a connector with perhaps twenty or more projections, which requires a downward force of about 500 pounds or more. Another type of interfering projection is in the shape of the eye of a needle, and each such projection requires a force of about 250 pounds to install it so as to seat the connector on the circuit board.

Figure 2:
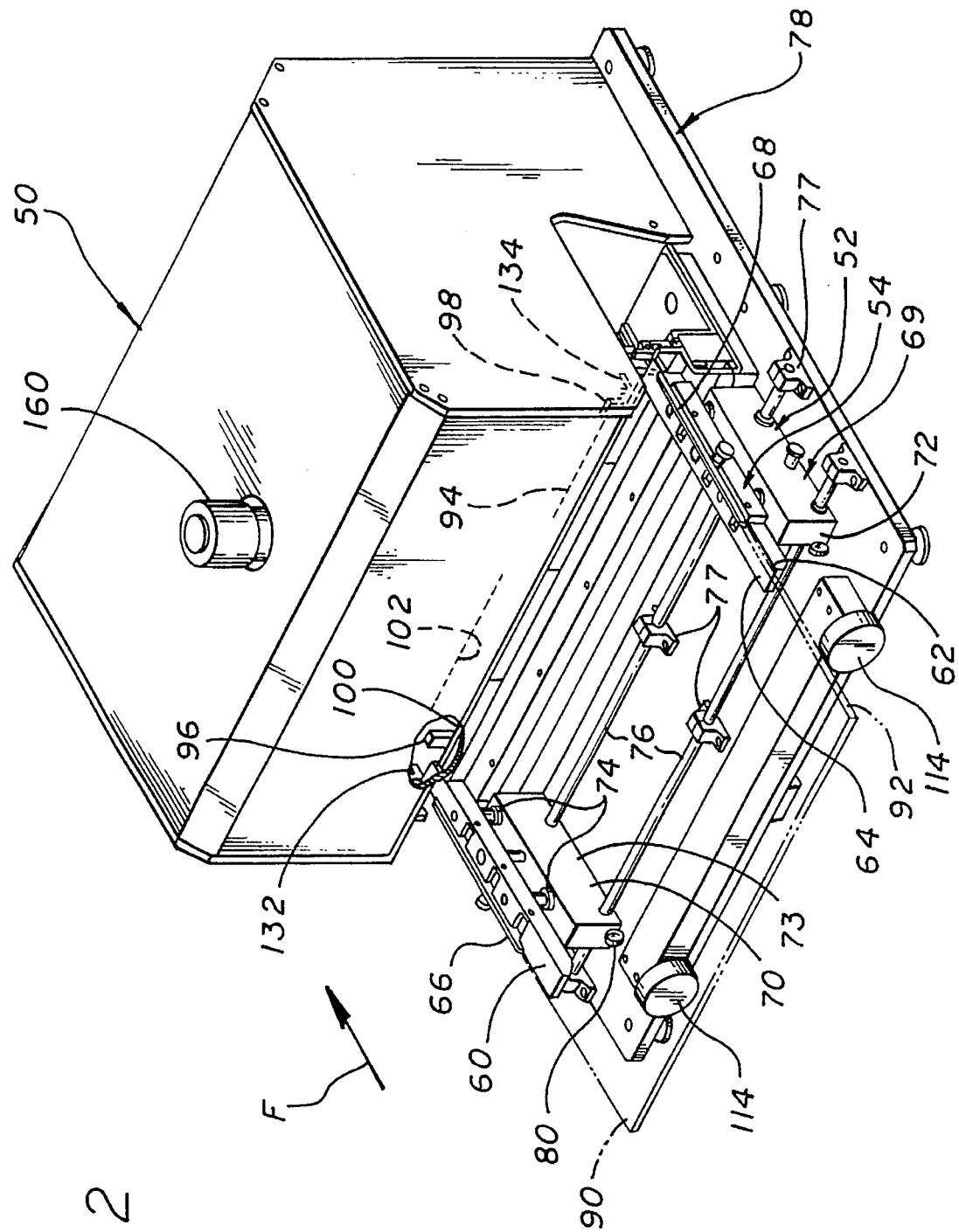
FIG. 2 is an isometric view of press apparatus of the present invention, with the circuit board shown in phantom lines thereon.

FIG. 2 illustrates a press arrangement 50 of the present invention, which includes a support apparatus 52 for supporting a circuit board 12. The support apparatus comprises a platform device 54 that includes left and right platforms 60, 62 that each has a board-supporting surface 64, and that each has an adjustable edge guide 66, 68 to abut a side edge of the circuit board. The support apparatus also includes a vertical guide device 69 with guides 70, 72 which each guides a corresponding platform 60, 62 in vertical movement while biasing the platform upwardly with springs 74. Each guide 70, 72 is horizontally movable towards and away from the other guide by movement along a horizontal guide formed by a pair of guide rods 76, with an adjustment knob 80 provided to lock each guide in place along the rods. The rods are held by mounts 77 that are fastened to a stationary base 78. It would be possible for the two platforms to be rigidly connected, and with only the guides 66, 68 movable together and apart, but the provision of two separate platforms results in a more open and versatile structure.

A circuit board with a connector lying thereon, but with the connector not fully seated on the board, is placed with its opposite side edge portions 90, 92 resting on the platforms 60, 62, with the distance between the platforms adjusted so the circuit board edges abut the adjustable edge guides 66, 68. The circuit board is pushed forwardly in the direction F until the front edge 94 of the circuit board abuts a pair of board stops 96, 98. A lower tooling arrangement 100 has been mounted on the base, while an upper tooling arrangement 102 has been mounted on a ram of the press.

Figure 3:
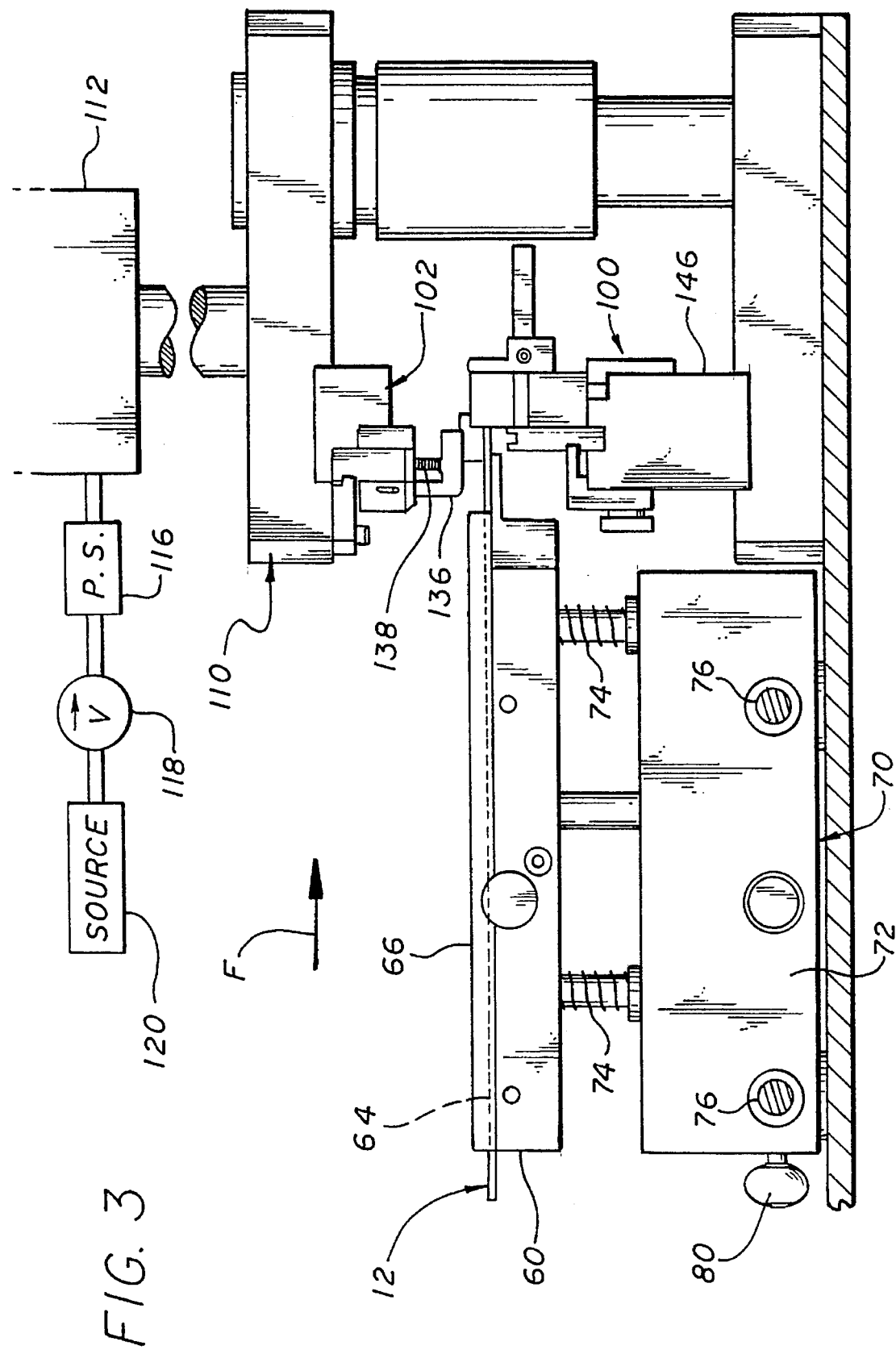
FIG. 3 is a side elevation view of a portion of the press apparatus of FIG. 1, with the ram in its upward position.

As shown in FIG. 3, the press includes a ram 110 which is moved down by a pneumatic actuator 112. When a pair of palm buttons (114, FIG. 2) are pushed, a directional valve 118 is operated. The valve 118 allows pressured air from a source 120 to flow into the actuator, so the pressured air can energize the actuator to cause the actuator to move down the ram 110. For the particular source 120 and actuator 112 that applicant has constructed, the ram applies a maximum downward force of 3,200 pounds when the source supplies air at 80 psi. A pressure sensing circuit 116 detects the stopped position of the ram (regardless of its final vertical displacement) and generates a signal that shifts the direction of the valve 118 to allow a spring (not shown) to raise the ram to its original position. The circuit 116 actually detects a change in air pressure in the actuator which indicates that the ram has stopped moving down, to allow the ram to move up. The mechanism includes devices that control the speed of ram movement, which is known in the art.

Figure 7:
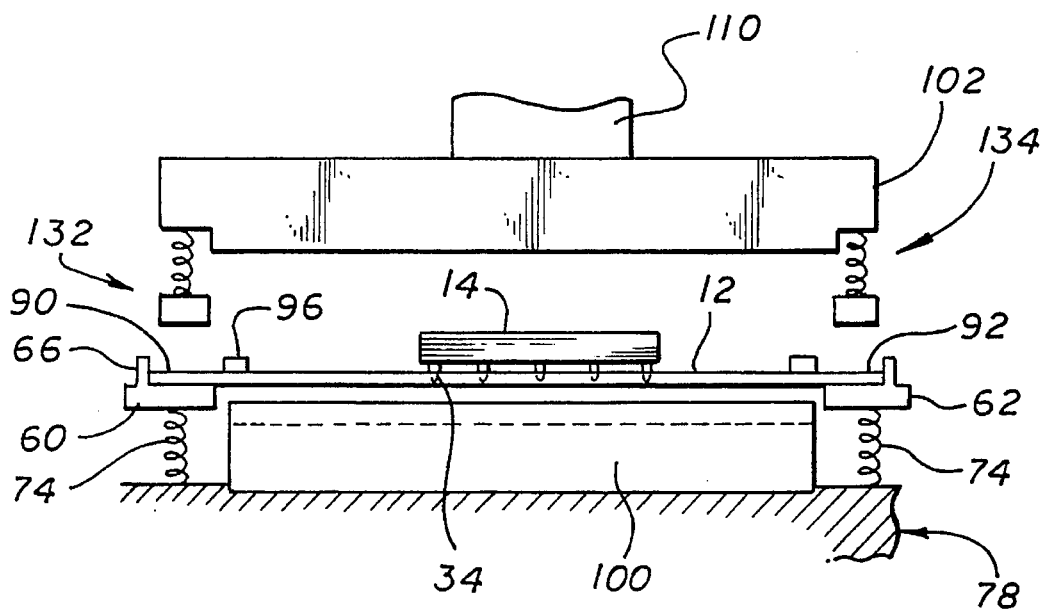
FIG. 7 is a simplified front view of the press apparatus of FIG. 2, with a circuit board and connector positioned thereon, and with the ram in its full upward position.
Figure 8:
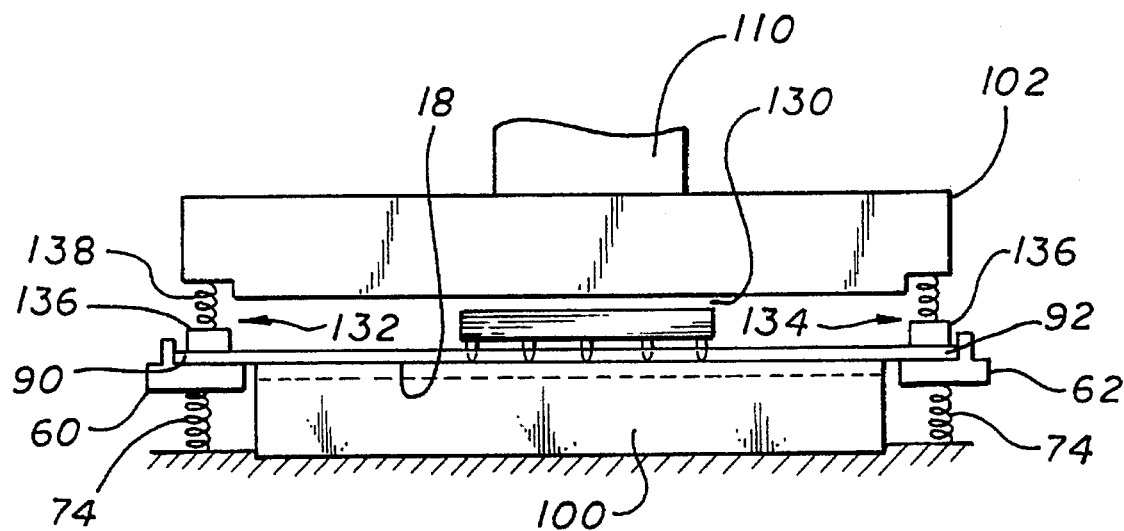
FIG. 8 is a view similar to that of FIG. 7, but with the ram shown partially lowered and with the circuit board lying against a lower tooling arrangement.
Figure 9:
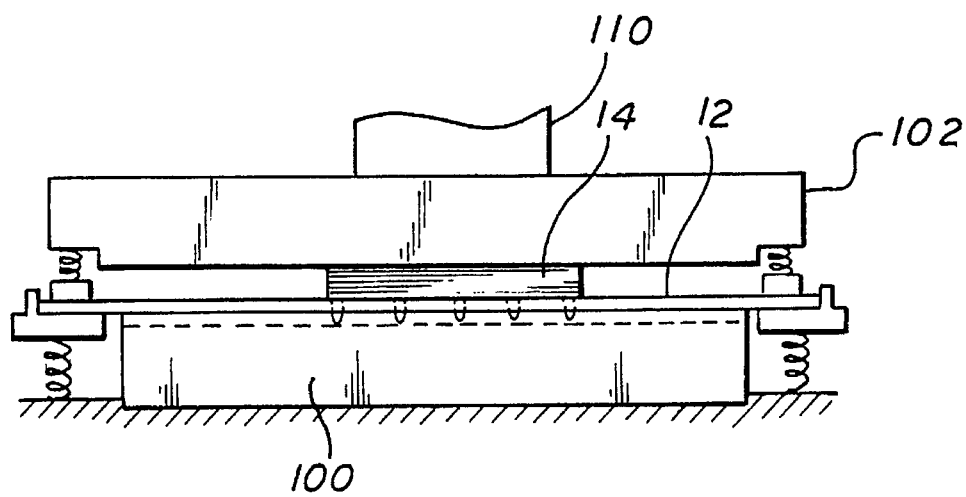
FIG. 9 is a view similar to that of FIG. 8, but with the ram fully lowered and with the connector fully seated on the circuit board.

FIG. 7–9 show the press apparatus and the circuit board and connector during the process of seating the connector on the circuit board. In FIG. 7, a circuit board 12 has been placed on the platforms 60, 62, and the connector 14 has been placed over the circuit board with its projections 34 aligned with board holes. The circuit board lies above the lower tooling arrangement 100, while the upper tooling arrangement 102 lies above the top of the connector.

FIG. 8 shows the ram 110 partially lowered, but with a gap 130 remaining between the upper tooling arrangement 102 and the connector 14. The ram carries a pair of board retainers 132, 134 that each includes a foot 136 connected by a spring 138 to the ram, so that the upper end of the spring moves up and down with the ram and with the upper tooling arrangement. In FIG. 8, the feet 136 of the two board retainers have already contacted the side edge portions 90, 92 of the circuit board and have pressed down the circuit board and the platforms 60, 62. As a result, the lower surface 18 of the circuit board presses against the lower tooling arrangement 100. In one example, the pair of springs 74 that bias each platform upwardly, are preloaded with a spring force of a total of one pound (for each platform), so that the two platforms are upwardly biased with a preload of two pounds. Each of the board retainer springs 138 has a preload of 1.5 pounds, so the two springs of the two board retainers are preloaded at three pounds. As a result, the platforms are pushed down with a net force of one pound which is opposed by the lower tooling 100. The board retainers avoid horizontal movement of the circuit board as it starts to move down.

FIG. 9 shows the ram moved down to its lowermost position, wherein it has pressed down the connector 14 to seat it on the circuit board 12. The ram applies a maximum downward force of 3,200 pounds (at an air supply pressure of 80 psi), and this force is supported by the lower tooling 100 to limit downward movement of the ram and of the upper tooling.

Figure 6:
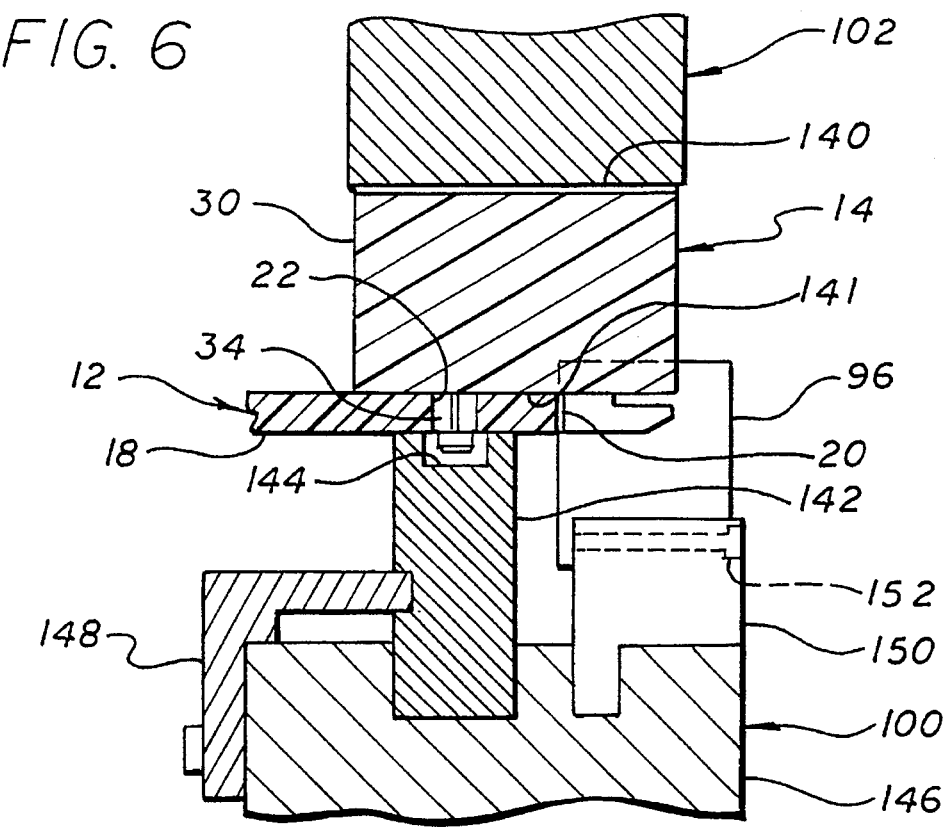
FIG. 6 is a sectional view of a portion of the press apparatus of FIG. 3, showing the ram in its fully lowered position and with the connector fully seated on the circuit board.

FIG. 6 shows the ram and upper tooling 102 in their lowermost position, wherein the upper tooling presses down against the top 140 of the connector housing 30. The ram has pressed the projections 34 into the circuit board holes 22 with a main housing bottom 141 lying against the upper face of the circuit board. Portions of the lower face 18 of the circuit board immediately around the holes 22, are supported by the lower tooling arrangement 100. The particular lower tooling arrangement includes a channel block 142 which has a relief channel 144, with opposite walls of the relief channel supporting the circuit board. The channel block 142 is mounted in a groove of a block 146 and is held by a retainer 148. FIG. 6 also shows that the board stop 96 is mounted on the block 146 through a support 150 that has a screw 152 to adjust the forward-to-rearward position of the stop (the sideward position of the stop is also adjustable).

A technician who must seat perhaps 100 groups of connectors on each of 100 circuit boards (that have predrilled holes), must install the proper lower and upper tooling arrangement on the press. The technician first loosens the adjustment knobs 80 (FIG. 2) and slides the vertical guide devices 70, 72 along the rods 76 until edge guides 66, 68 on the platforms abut opposite side edges of the circuit board. The technician then turns the knobs 80 to fix the vertical guide devices in place. In many cases, the technician does not have to adjust the ram stroke to account for the thickness of the circuit boards and connectors, since the ram stroke is limited by the reaction of the lower tooling arrangement through the circuit board and the connector. In some cases the maximum downward force of the ram can be adjusted, as by adjusting the maximum air pressure supplied through a pressure regulator to the actuator, or by adjusting a speed control that adjusts the dwell time (and therefore the time for pressure buildup) at the bottom of the ram stroke. In those cases, a technician may adjust the ram force so it is not much above that required to seat the connectors. However, connectors can withstand large compressive forces and the circuit boards can withstand large forces when properly supported at their lower faces, so adjustment is usually not required. Where the maximum ram force cannot be adjusted and a connector is to be installed which cannot withstand the large ram force, then the maximum stroke of the ram can be limited. In FIG. 2, a stop adjust nut 160 is provided which can limit the ram stroke so it is less than the maximum, although the determination of the proper ram stroke can be time consuming.

Thus, the invention provides a press apparatus for seating connectors on circuit boards, which minimizes setup time in a press apparatus of only moderate complexity. The press apparatus includes upper and lower tooling arrangements, with one of them such as the lower one being fixed in position on the base of the machine and with the other one mounted on a vertically movable ram. A platform device which supports the circuit board, is vertically movable and biased upwardly. When the ram moves down, the circuit board moves down against the lower tooling and the ram moves down against the connector to seat it. The ram is preferably set so its stroke is not limited, but instead the downward movement of the ram is limited only by the support provided by the lower tooling, circuit board, and connector. The platform device includes two platforms that each supports a side edge guide, with the platforms being lockable at positions of different separation so their guides can abut the side edges of a circuit board to position it, and with each platform being upwardly biased and vertically movable.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A press apparatus which has a base and a ram that is forcefully movable on said base, for seating a connector on a circuit board by pressing projections of the connector into board holes of the circuit board, comprising:

a support apparatus mounted on said base for supporting said circuit board with said connector thereon;

upper and lower tooling arrangements with a first of them mounted on said base and with a second of them mounted on said ram and movable by the ram toward the first of them;

said support apparatus includes a platform device positioned on said support apparatus to hold said circuit board and connector thereon vertically between said tooling arrangements, and with said platform device being vertically movable with respect to said support apparatus and said support apparatus including a vertical guide device which guides said platform device in vertical movement on said base.

2. Press apparatus for seating a connector on a circuit board that has opposite side edge portions by pressing connector projections that extend from a main connector housing into board holes in the circuit board, wherein the press apparatus includes a base and a support assembly for supporting the board, characterized by:

said support assembly includes a pair of platforms each having an upper board-supporting surface for supporting a different one of said opposite side edge portions of the circuit board;

said press apparatus includes a lower tooling arrangement mounted on said base, a ram which is movable down from an upper ram position, and an upper tooling arrangement mounted on said ram above said lower tooling arrangement, and said press apparatus is operable to move said ram and upper tooling arrangement to press down a connector lying on a circuit board which has opposite edge portions lying on said board-supporting surfaces;

said support assembly including a vertical guide device which guides said platforms in vertical motion with respect to said base, and a spring which biases said platforms upwardly to an upward position wherein a circuit board on said platforms lies between said upper and lower tooling arrangements when said ram is in its upward position.

3. The press described in claim 2 wherein:

said platforms each includes an edge guide which is positioned to abut a corresponding side edge of the circuit board, and said vertical guide device includes first and second vertical guides that each support a different one of said platforms;

said support assembly comprises a horizontal guide, with at least one of said vertical guides being horizontally slidable on said horizontal guide to be movable to positions at different distances from the other of said vertical guides.

4. The press described in claim 2 including:

a circuit board having opposite side edge portions each supported on the board-supporting surface of one of said platforms, and a connector mounted on a board portion that lies between said board-supporting surfaces, with said connector having a top lying directly under said upper tooling arrangement.

5. A press apparatus which has a base and a ram that is forcefully movable on said base, for seating a connector on a circuit board by pressing projections of the connector into board holes of the circuit board, comprising:

a support apparatus mounted on said base for supporting said circuit board with said connector thereon;

upper and lower tooling arrangements with said lower tooling arrangement mounted on said base and with said upper tooling arrangement mounted on said ram and movable by the ram toward said lower tooling arrangement;

said support apparatus includes a platform device positioned to hold said circuit board and connector thereon vertically between said tooling arrangements and a vertical guide device which guides said platform in vertical movement on said base;

said platform device includes first and second platforms, each positioned to support a side edge portion of a circuit board, and said guide device includes first and second guides that are each constructed to support a corresponding one of said platforms in vertical movement while biasing each of them upwardly to a predetermined upward position, with at least one of said platforms being movable to positions of different distances from the other.

6. The press apparatus described in claim 5 including:

a pair of retainers mounted on said ram, each retainer having a foot and a foot spring which bias the foot downwardly toward a downward position with respect to said ram, with each foot being positionable to lie over one of said platforms to press down an edge portion of a circuit board that lies on one of said platforms, said feet being positioned to engage said circuit board edge portions and move them down before said upper tooling arrangement engages said connector.

7. The press apparatus described in claim 5 including:

a circuit board having opposite side edge portions each supported on the board-supporting surface of a different one of said platforms, and a connector mounted on a board portion that lies between said platforms, with said connector having a top lying directly under said upper tooling arrangement.

* * * * *